United States Patent
Kitao et al.

[11] Patent Number: 5,877,747
[45] Date of Patent: *Mar. 2, 1999

[54] REMOTE CONTROL SYSTEM WITH A POINTING DEVICE

[75] Inventors: Satoshi Kitao, Kyoto; Youichi Ishibashi; Takayuki Kimoto, both of Osaka, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 657,737

[22] Filed: May 31, 1996

[30]  Foreign Application Priority Data

Jun. 2, 1995  [JP]  Japan ................... 7-136458

[51] Int. Cl.$^6$ .............. G09G 5/08; G06F 3/033
[52] U.S. Cl. ........................... 345/160; 345/161
[58] Field of Search .................. 345/157, 158, 345/160, 161; 348/734; 364/709.11, 709.12

[56]  References Cited

U.S. PATENT DOCUMENTS

| | | | |
|---|---|---|---|
| 5,109,222 | 4/1992 | Welty | 340/825 |
| 5,181,015 | 1/1993 | Marshall et al. | 340/706 |
| 5,652,630 | 7/1997 | Bertram et al. | 348/734 |
| 5,670,988 | 9/1997 | Tickle | 345/157 |

FOREIGN PATENT DOCUMENTS

| | | |
|---|---|---|
| 6-214695 | 8/1994 | Japan . |
| 7-64044 | 3/1995 | Japan . |
| 2244546 | 12/1991 | United Kingdom . |

*Primary Examiner*—Jeffery Brier
*Attorney, Agent, or Firm*—McDermott, Will & Emery

[57]  ABSTRACT

A remote control system with a pointing device which can control the computer itself also by the pointing device as well as by the key input device.

The remote controller comprising a key input device, a pointing device, a first controller which is provided for encoding a key code (KC) signal to a remote control signal, a second controller provided for encoding a pointer control (PC) signal to a remote control signal, an output device outputs the remote control (RC) signal, and said receiver comprising a receive device for receiving the RC signal, a third controller outputs a control signal for controlling a computer a fourth controller outputs a coordinate signal for moving a pointer on a computer display, a first decoder decodes the RC signal to the KC signal and outputs the KC signal to the third controller, and a second decoder decodes said RC signal to the PC signal and outputs the PC signal to the fourth controller and also the third controller.

16 Claims, 4 Drawing Sheets

REMOTE CONTROL SYSTEM WITH A POINTING DEVICE

FIELD OF THE INVENTION

The present invention relates to a remote control system with a pointing device for a computer or a projection system which projects pictures of a computer on a screen.

BACKGROUND OF THE INVENTION

Referring now to the accompanying drawings, an example of a wireless remote control system with a pointing device of prior art is described below, which, for example, is typically described in the Japanese Patent Application No. 5-7721 of 1993.

FIG. 1. describes a electric circuit of a wireless remote control system with a pointing device of a prior art. A remote controller 6 comprises a key input device 1, a pointing device 2, a first controller 3, a second controller 4, and optical output device 5. Usually, a computer key board may be the key input device 1 and mouse or track ball may be the pointing device 2. The key input device 1 is provided to input a character, text data and the like to a computer or to operate a computer itself. The operations of the computer itself are, for example, the picture adjustment of the computer display, changing the input source of the computer, an operate of a memory device and the like. As described below, the key input device 1 outputs a key code signal to the first controller 3. The pointing device 2 is provided to move a pointer on the computer display. The pointing device 2 outputs a pointer control signal to the second controller 4. The first controller 3 is provided for encoding the key code signal to a remote control signal by means of a carrier-wave-modulation. The second controller 4 encodes the pointer control signal to a remote control signal. The optical output device 5 outputs the remote control signal in a form of infrared rays to the receiver 10.

The receiver 10 comprises a receive device 7, a decoder 8 and a controller 9. The receive device 7 receives a remote control signal from optical output device 5 of the remote controller 6. A receptor unit is preferably used as the receive device 7. The decoder 8 decodes a remote control signal received by the receive device 7 to a key code signal or a pointer control signal and outputs them to the controller 9, The controller 9 outputs a control signal to a computer on the bases of said key code signal or coordinate signal.

FIG. 2. shows a structure of the remote control signal. The remote control signal comprises Reader Codes, Custom Codes, and Data Codes. The remote control signals are consisting of digital signals which transformed by the pulse modulation. The Leader Codes are identification codes for discriminating the remote control signal from noises. The Custom Codes are identification codes for specifying the equipment which is controlled with the remote controller. The order which inputted with the key input device 1 or the pointing device 2 is discriminated by the Data Codes. A user of the computer makes an order to control the computer with the key input device 1 and the pointing device 2. The operation in this constitution of prior art is explained as follows;

(1) When the receive device 7 receives the remote control signal of the key code signal inputted with the key input device 1, the decoder 8 decodes the remote control signal to the key code signal and controller 9 transforms the key code signal to the control signal in the form of the controlled computer to input characters or text data to the computer or to bring the computer itself in control by order of the key input device 1 .

(2) When the receive device 7 received the remote control signal of the pointer control signal inputted with the pointing device 2, the decoder 8 decodes the remote control signal to the pointer control signal and controller 9 transforms the pointer control signal to the coordinate signal in the form of the controlled computer to move a pointer on the computer display by order of the pointing device 2.

Thus, according to this constitution of a prior art, a computer input system with a key board and a pointing device can be wireless from a computer.

However, the remote control system with a pointing device of a prior art can not implement the order of controlling the computer it self with the pointing device 2 because the key code signal and pointer control signal which decoded by the decoder 8 are independently inputted to controller 9.

SUMMARY OF THE INVENTION

An object of the invention is to provide a remote control system with a pointing device which can control the computer itself also by the pointing device as well as by the key input device.

In order to achieve the above object, the present invention provides a remote controller which comprises a remote controller and a receiver;

said remote controller includes;

a key input device;

a pointing device;

a first controller provided for encoding a key-code-signal inputted with said key input device to a key-remote-control-signal;

a second controller provided for encoding a pointer-control-signal inputted with said pointing device to a pointer-remote-control-signal;

an output device suitable to output either said key-remote-control-signal or pointer-remote-control-signal; and said receiver including;

a receive device suitable to receive either said key-remote-control-signal or pointer-remote-control-signal;

a first decoder decodes said key-remote-control-signal to said key-code-signal and outputs said key-code-signal to a third controller; and a second decoder decodes said pointer-remote-control-signal to said pointer-control-signal and outputs said pointer-control-signal to said third controller and a fourth controller;

said third controller outputs a control signal for controlling a computer according to either key-code-signal outputted by said first decoder or pointer-control-signal outputted by said second decoder; and said fourth controller outputs a coordinate signal for moving a pointer on a computer display according to said pointer-control-signal outputted by said second decoder.

By the structure mentioned above, a user of this remote control system can implement the controls of the computer itself with the pointing device as well as the key input device and then operability of the computer can be improved notably.

Further, providing the cut-off device for cutting off the pointer-control-signal between the second decoder and the fourth controller which provides a coordinate signals according to the outputs of the second decoder, a pointer does not move unnecessarily at the time of the key control mode.

DESCRIPTION OF THE PREFERRED EMBODIMENTS (First Embodiment)

Figure 1:
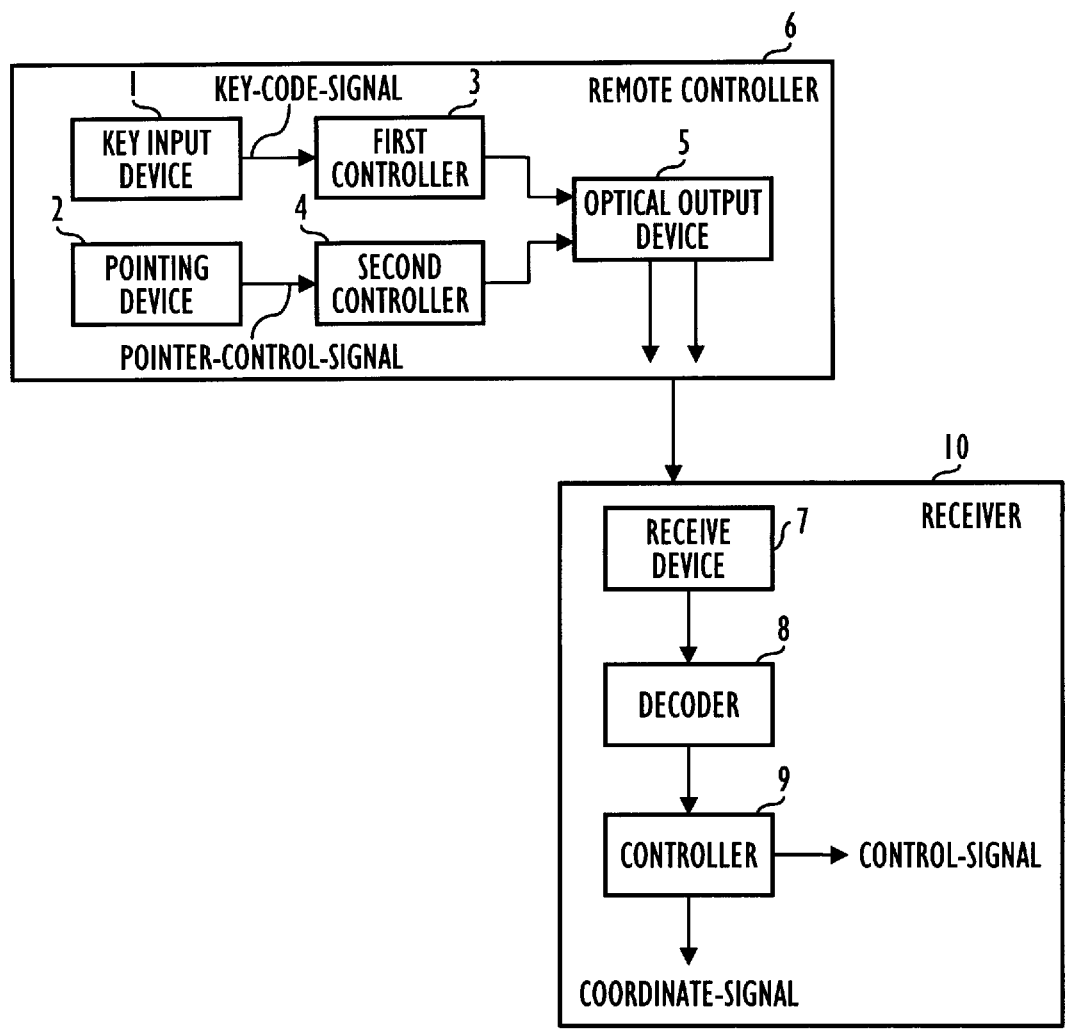
FIG. 1 illustrates an electric circuit of a wireless remote control system with a pointing device of a prior art.
Figure 2:
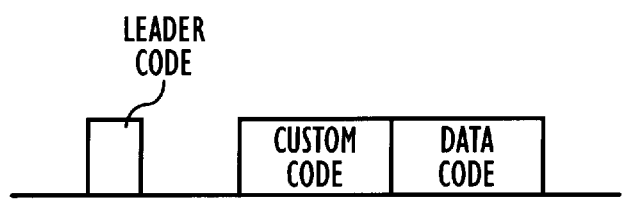
FIG. 2 illustrates a constitution of a remote control signal of a prior art.
Figure 3:
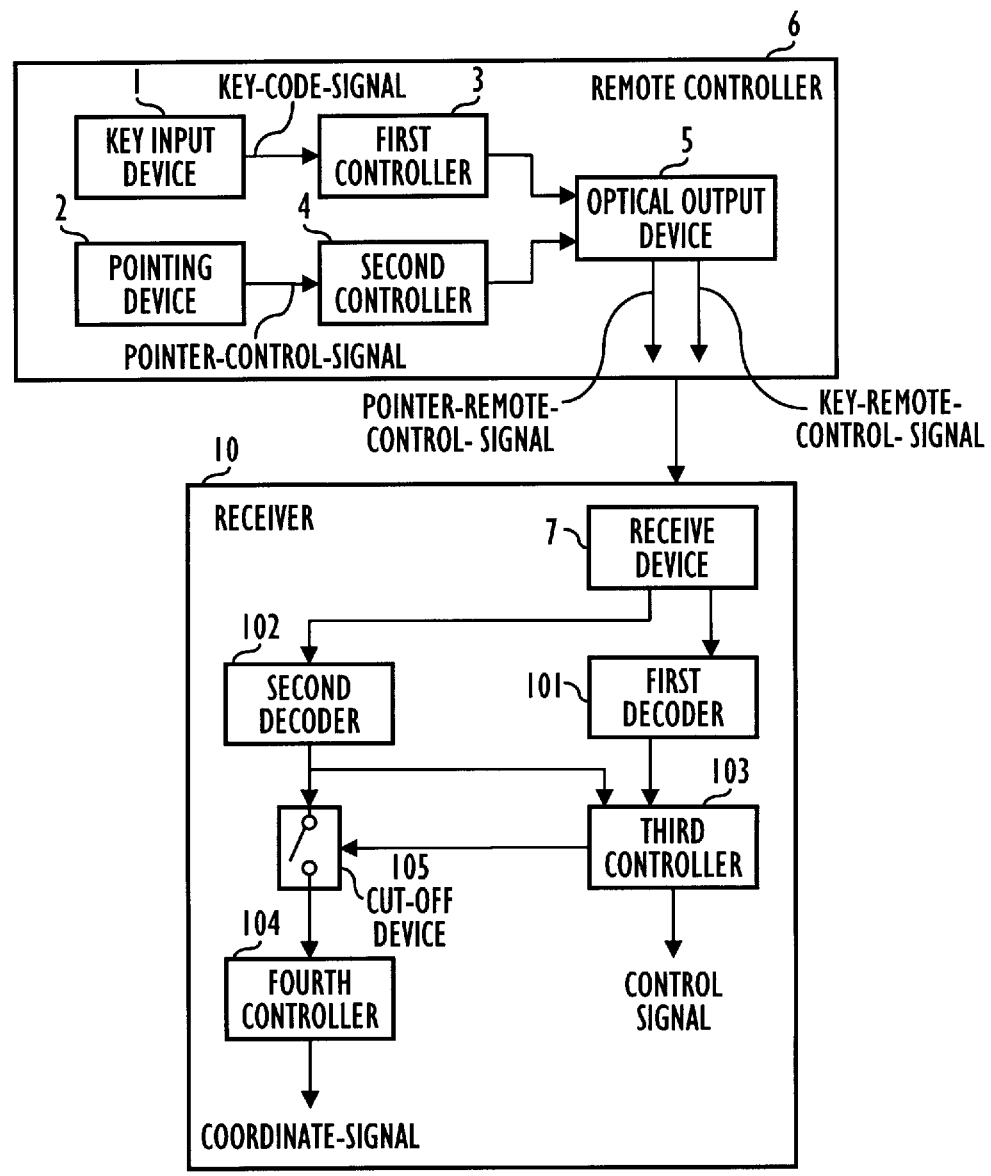
FIG. 3 illustrates a first embodiment of a wireless remote control system with a pointing device.

Referring now to the FIG. 3, the first embodiment of the invention is described below. Some parts as described in the prior art are identified with same reference numerals and their explanations are omitted. As shown in the drawing, the receiver 110 has a receive device which receives a remote-control-signal (either key-remote-control-signal or pointer-remote-control-signal) from the optical output device 5 of the remote controller 6. The first decoder 101 decodes a remote-control-signal received by the receive device 7 to the key-code-signal and outputs the key-code-signal to the third controller 103. The second decoder 102 decodes a remote-control-signal to a pointer-control-signal and outputs the pointer-control-signal to the fourth controller 104 and also third controller 103. The third controller 103 outputs the control signal to bring a computer in control in accordance to the order indicated by the key-code signal.

The fourth-controller 104 outputs the coordinate signal to move a pointer on the computer display according to the pointer control signal. The switch 105 is controlled by the third controller to cut off the pointer-control- signal between the second decoder 102 and the fourth controller 104 when the key control mode was selected by the key control mode select device (not indicated in FIG. 3). The key control mode select device is provided in remote controller 6 as a specific key. when the key control mode was selected with the key control mode select device, a remote-control-signal is outputted by the optical output device 5 to the receive device 7 in the form of infrared rays. The remote-control-signal includes the identification codes by which the receiver 110 identifies the key control mode. The operation in this constitution is explained as follows;

(1) When the receive device 7 received the key-remote-control-signal inputted with the key input device 1, the first decoder 101 decodes the key-remote-control-signal to the key-code-signal and third controller 103 transforms the key-code-signal to the control signal in the form of the controlled computer to input characters or text data to the computer or to bring the computer itself in control by order of the key input device 1.

(2) When the receive device 7 received the pointer-remote-control-signal inputted with the pointing device 2, the second decoder 102 decodes the pointer-remote-control-signal to the pointer-control signal and fourth controller 104 transforms the pointer-control- signal to the coordinate signal in the form of the controlled computer to move a pointer on the computer display by order of the pointing device 2. In this situation, the switch 105 is controlled by third controller 103 in order to connect the second decoder 102 with the fourth controller 104.

(3) In the case the key control mode was selected by the key control mode select device, The key-remote-control-signal which includes the identification code of the key control mode is decoded by the first decoder and the key control mode is recognized by the third controller 103 to cut off the pointer-control-signal between the second decoder 102 and the fourth controller 104. At this time or after that, when the receive device 7 receives the pointer-remote-control-signal which is inputted with the pointing device 2, the second decoder 102 decodes the pointer-remote-control-signal to the pointer-control-signal and outputs the pointer-control-signal to the third controller 103. Third controller 103 transforms the pointer-control-signal to the control signal in the form of the controlled computer to bring the computer in control by the order of the pointing device in same way of the key input signal. Thus, according to the first embodiment, a user of this remote controller can execute same controls of the computer itself with the pointing device 2 as well as key input device 1. The same controls of the computer itself are including picture luminance adjustment, picture color adjustment, vertical-horizontal line adjustment, picture source change, volume adjustment and the like, which are ordinary inputted with key input device. Further, having the switch 105 for cutting off the pointer-control-signal between the second decoder 102 and the fourth controller 104, a pointer does not move unnecessarily on the computer display at the time of the key control mode.

(Second Embodiment)

Figure 4:
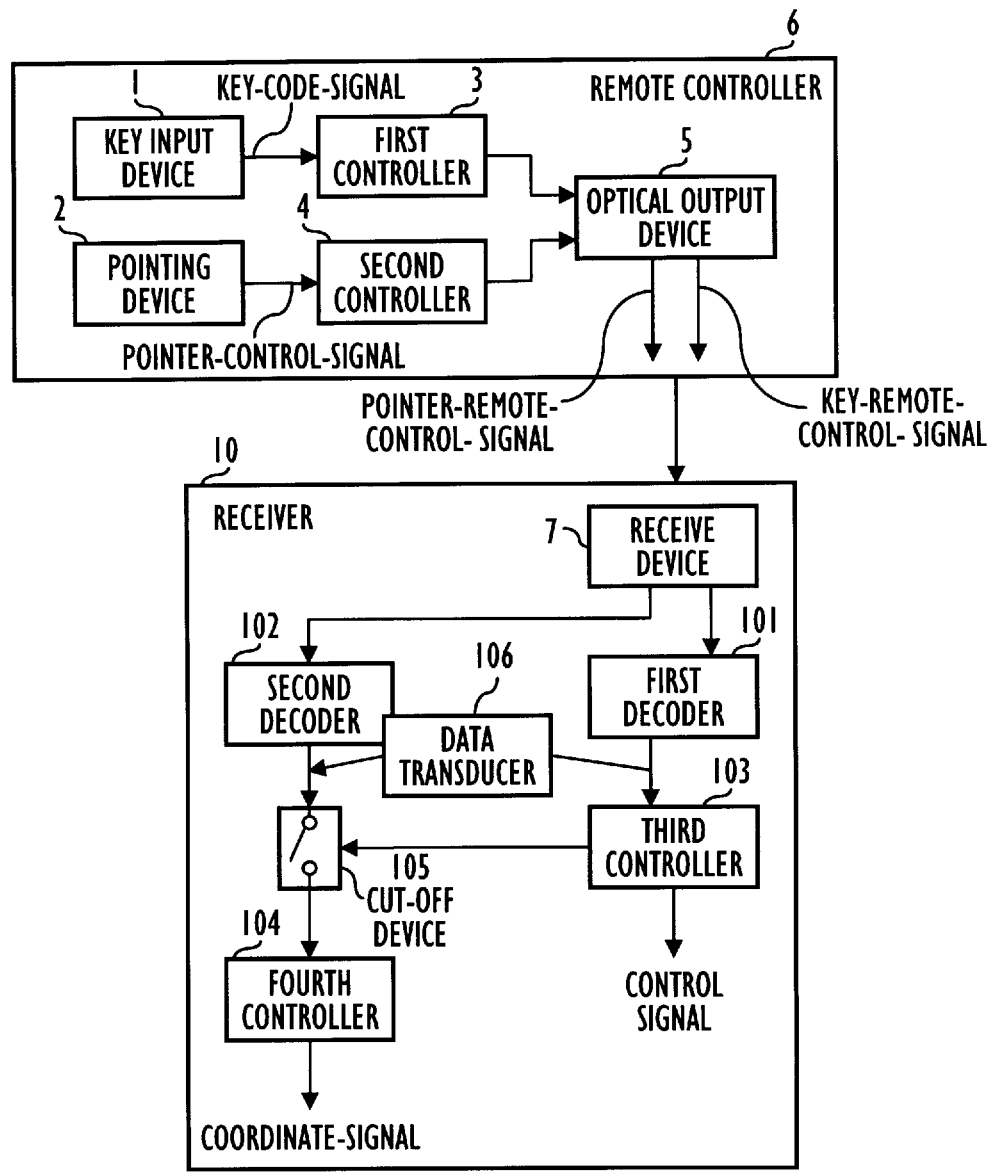
FIG. 4 illustrates a second embodiment of a wireless remote control system with a pointing device.

Second embodiment of the invention is described below by reference to FIG. 4. As shown in drawings, the data transducer 106 is provided between second decoder 102 and third controller 103 in the constitution of the first embodiment. The other constitution is as same as in the first embodiment. The same parts as in the first embodiment are identified with same reference numerals and their explanation are omitted. Explaining the operation in this constitution by reference to FIG. 3, when the receive device 7 received the pointer-remote-control-signal which is inputted with the pointing device 2, the second decoder 102 decodes the pointer-remote-control-signal to the pointer-control-signal and outputs the pointer-control-signal to the data transducer 106. In the case when the key control mode is selected by the key control mode select device, the data transducer 106 transforms the pointer control signal to the key code signal in the same form of the output of the first decoder 101, and puts out the key-code-signal to the third controller 103. Third controller 103 transforms the key-input-signal to the control signal corresponding with the controlled computer to bring the computer in control in accordance with the order of the pointing device in the same way of the key input device. Thus, according to the second embodiment, so the pointing-control-signal is inputted to the third controller 103 in the form of the key-code-signal by the data transducer 106, That the third controller 103 can work by the pointer-control-signal in the form of the key-input-signal, the throughput of the third controller 103 is reduced and processing speed is improved.

(Third Embodiment)

Figure 5:
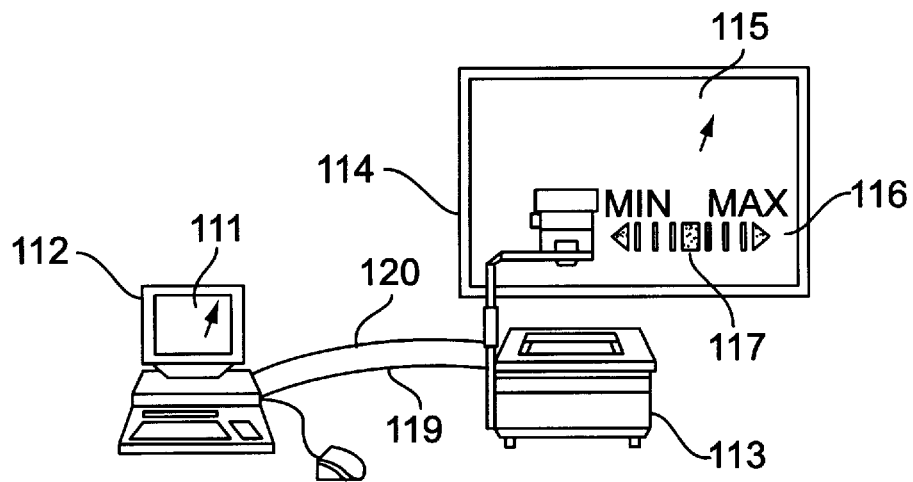
FIG. 5 illustrates a projection system of a third embodiment of a wireless remote control system with a pointing device.
Figure 6:
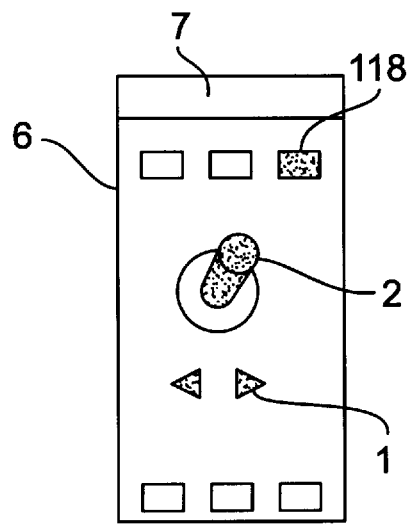
FIG. 6 illustrates a remote controller of a third embodiment of a wireless remote control system with a pointing device.

Recently graphic pictures of a computer can be projected on a screen by a projection system with a liquid crystal display, mainly by a Over Head Projector. The first and second embodiment of this invention can be applied for such projection system projecting the display of computer. Third embodiment of the invention is described below reference to FIG. 5 and FIG. 6. FIG. 5 shows the projection system of this third embodiment and FIG. 6 shows the one example of the remote controller 6 of this embodiment. The projector 113 projects the picture of the computer 112 on the screen 114 with a liquid crystal display. The projector 113 has a picture adjustment function, for example such picture adjustment including picture luminance adjustment, picture color adjustment, vertical-horizontal line adjustment and so on which is able to be controlled on-screen picture 116 by moving a cursor 117. The pointer 111 on the picture of the computer 112 is projected on the screen 114 through the cable 120. The controller 6 has a on-screen mode select switch 118, the input device 1 which is provided for entering the order to control the cursor 117 of the on-screen picture 116, and the pointing device 2 which is provided for controlling the pointer 111 on the picture of the computer 112. In this embodiment, a joy stick is preferred to be applied as the pointing device 2 due to the size of the controller 6. The other constitution of the remote controller 6 is as same as the first embodiment and their explanations are omitted. On the other hand, the receiver 110 is provided inside of the projector 113 and the coordinate signal which is omitted from the fourth controller 104 is sent to the computer 112 through the cable 119. The picture of the computer 112 is also sent to the projector 113 through the cable 120. The other constitution of the receiver 110 is as same as the first embodiment then their explanations are omitted. The operation in this constitution of the third embodiment is explained as follows;

(1) in the case the on-screen mode is not selected, the pointer-remote-control-signal for the pointer control is outputted from the optical output device 5 by order of the joy stick 2, then the pointer-remote-control-signal is entered to the receiver 110 of the projector 113. The pointer-remote-control-signal is decoded to the pointer-control-signal by the second decoder 102, then the fourth controller 104 outputs the coordinate signal in accordance with the pointer-control-signal to the computer 112 through the cable 119. The computer 112 bring the pointer 112 in control according to the coordinate signal. Then the picture is sent to the projector 113 through the cable 120 and is projected on the screen 114.

(2) In the case the on-screen mode is selected with the mode select switch 118, the cursor-remote-control-signal which indicate the mode change by the identification codes is entered to the projector 113. Then the projector 113 puts the on-screen mode picture 116 on the projection screen 114 and also the switch 105 cut off the signal between the second decoder 102 and the fourth decoder 104 according to the order of the third controller 103 at the same time. When the joy stick 2 is moved by a user at this situation, the pointer-control-signal which is decoded by the second decoder 102 is sent to the third controller 103, then the third controller 103 outputs the cursor-control-signal which moves the cursor 117 according to the pointer-control-signal. The projector 113 moves the cursor 117 and also controls it's picture in accordance with the pointer-control-signal. Due to the cut-off by the switch 105 and the third controller 103, a coordinate signal is not outputted from the fourth controller 104 and the pointer 115 does not move unnecessarily in the on-screen mode. In the same way as described in the first embodiment, the cursor 117 is able to be moved with the key input device 1 then their explanation is omitted. Thus, according to the third embodiment, a user can control the cursor of the on-screen picture 116 and can make a presentation with such projection system more effectively.

Also due to the cut off device 105, the pointer 111 and 115 is not moved unnecessarily in the on-screen mode. Of course, it should be noted that a wide range of changes and modifications can be made to the preferred embodiment described above. It is therefore intended that the foregoing detailed description be understood that it is the following claims, including all equivalents, which are intended to define the scope of this invention.

We claim:

1. A remote control system with a pointing device comprising:
    a remote controller and a receiver;
        said remote controller including:
            a key input device;
            a pointing device;
            a first controller provided for encoding a key-code-signal inputted with said key input device to a key-remote-control-signal;
            a second controller provided for encoding a pointer-control-signal inputted with said pointing device to a pointer-remote-control-signal; and
            an output device suitable to output either said key-remote-control-signal or pointer-remote-control-signal; and
        said receiver including:
            a receive device suitable to receive either said key-remote-control-signal or pointer-remote-control-signal;
            a first decoder that decodes said key-remote-control-signal to said key-code-signal and outputs said key-code-signal to a third controller; and
            a second decoder that decodes said pointer-remote-control-signal to said pointer-control-signal and outputs said pointer-control-signal to said third controller and a fourth controller;
            wherein said third controller outputs a control signal for controlling a computer according to either key-code-signal outputted by said first decoder or pointer-control-signal outputted by said second decoder; and
            wherein said fourth controller outputs a coordinate signal for moving a pointer on a computer display according to said pointer-control-signal outputted by said second decoder.

2. A remote control system with a pointing device of claim 1,
    said remote controller having a mode select device; and
    said receiver having a cut-off device for cutting off said pointer-control-signal between said second decoder and said fourth controller when a key input mode is selected by said mode select device.

3. A remote control system with a pointing device of claim 1, said key-remote-control-signal and said pointer-remote-control-signal including an identification code for discriminating between said key-code-signal and pointer-control-signal.

4. A remote control system with a pointing device of claim 2, said cut-off device is controlled by said third controller.

5. A remote control system with a pointing device of claim 1, said receiver having a data transducer which transforms said pointer-control-signal in a form of said key-code-signal.

6. A remote control system with a pointing device of claim 1, said first controller and said second controller transforms said key-code-signal and said pointer-control-signal to said key-remote-control-signal and said pointer-remote-control-signal by means of a carrier-wave-modulation.

7. A remote control system with a pointing device of claim 1, said key input device is consisting of a key board of said computer.

8. A remote control system with a pointing device of claim 1, said pointing device is consisting of a mouse.

9. A remote control system with a pointing device of claim 1, said pointing device is consisting of a track ball.

10. A remote control system with a pointing device of claim 1, said pointing device is consisting of a joy stick.

11. A remote control system with a pointing device for a projection system having a on-screen control comprising:

remote controller and a receiver;

wherein said remote controller includes:

a key input device for moving a cursor of said on-screen control;

a pointing device for moving a pointer on a display of said computer;

a first controller provided for encoding a cursor-control-signal inputted with said key input device to a cursor-remote-control-signal;

a second controller provided for encoding a pointer-control-signal inputted with said pointing device to a pointer-remote-control-signal;

an output device suitable to output either said cursor-remote-control-signal or said pointer-remote-control-signal; and wherein said receiver includes:

a receiver device suitable to receive either said cursor-remote-control-signal or said pointer-remote-control-signal;

a first decoder that decodes said cursor-remote-control-signal to said cursor-control-signal and outputs said cursor-control-signal to a third controller; and a second decoder that decodes said pointer-remote-control-signal to said pointer-control-signal and outputs said pointer-control-signal to said third controller and a fourth controller;

wherein said third controller outputs a control signal for controlling a computer according to either said cursor-control-signal outputted by said first decoder or said pointer-control-signal outputted by said second decoder; and wherein said fourth controller outputs a coordinate signal for moving a pointer on a computer display according to said pointer-control-signal outputted by said second decoder.

12. A remote control system with a pointing device for a projection system having an on screen control of claim 11, said remote controller having an on-screen mode select device; and said receiver having a cut-off device for cutting off said pointer-control-signal between said second decoder and said fourth controller when an on-screen control mode is selected by said on-screen mode select device.

13. A remote control system with a pointing device for a projection system having an on-screen control of claim 11, said cursor-remote-control-signal and said pointer-remote-control-signal comprising an identification code for discriminating between said cursor-control-signal and pointer-control-signal.

14. A remote control system with a pointing device for a projection system having an on-screen control of claim 13, said cut-off device is controlled by said third controller.

15. A remote control system with a pointing device for a projection system having an on-screen control of claim 11, said receiver having a data transducer which transforms said pointer-control-signal in a form of said cursor-control-signal.

16. A remote control system with a pointing device for a projection system having an on-screen control of claim 11, said on-screen control controls a picture adjustment of said projection system.

* * * * *